Jan. 26, 1965  A. W. HOLSTEIN ETAL  3,167,215
VENDING MACHINE
Filed June 6, 1960  12 Sheets-Sheet 1

Alvin W. Holstein,
Clifford B. Adams,
Charles D. Visos,
Inventors.
Koenig and Pope,
Attorneys.

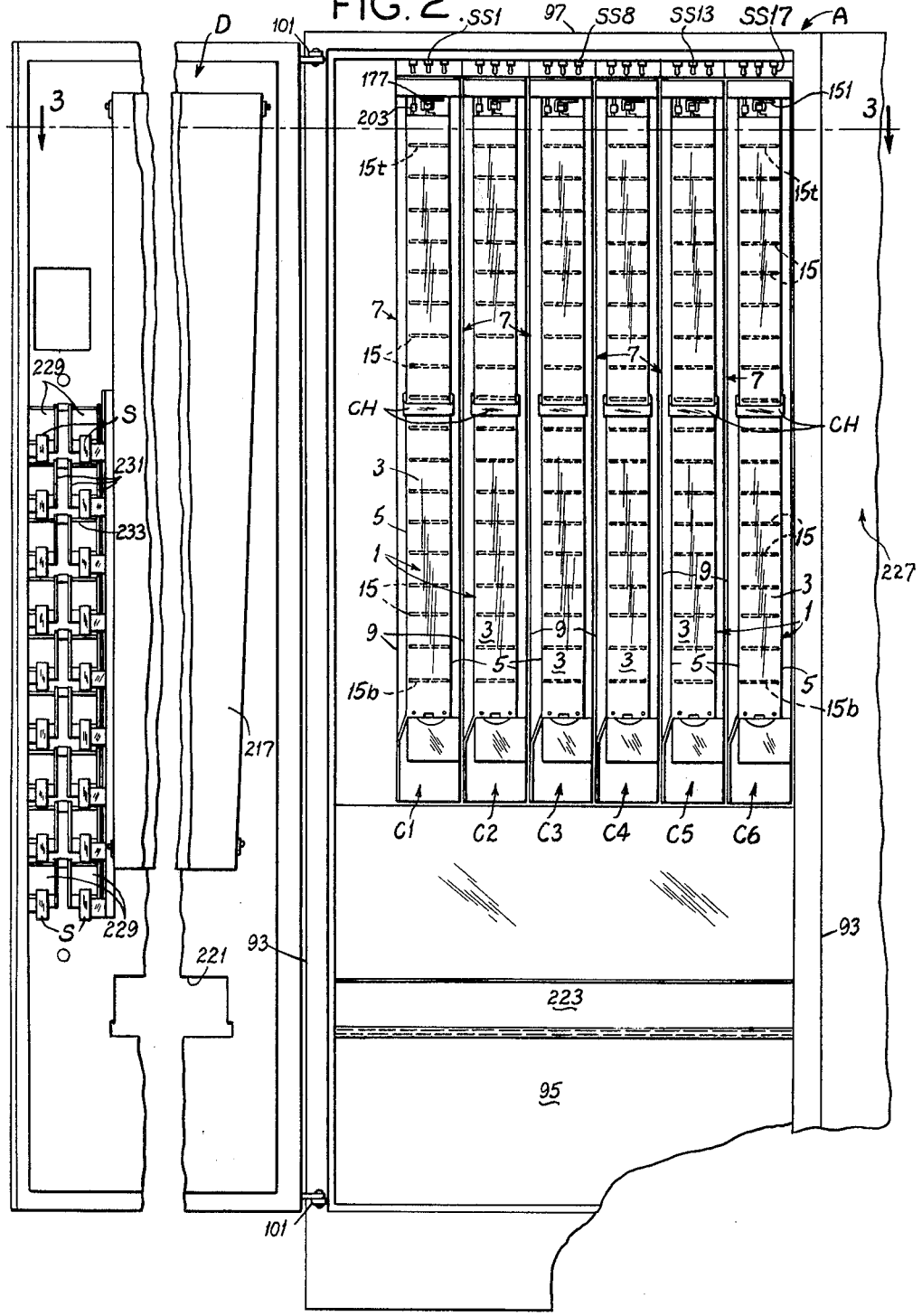

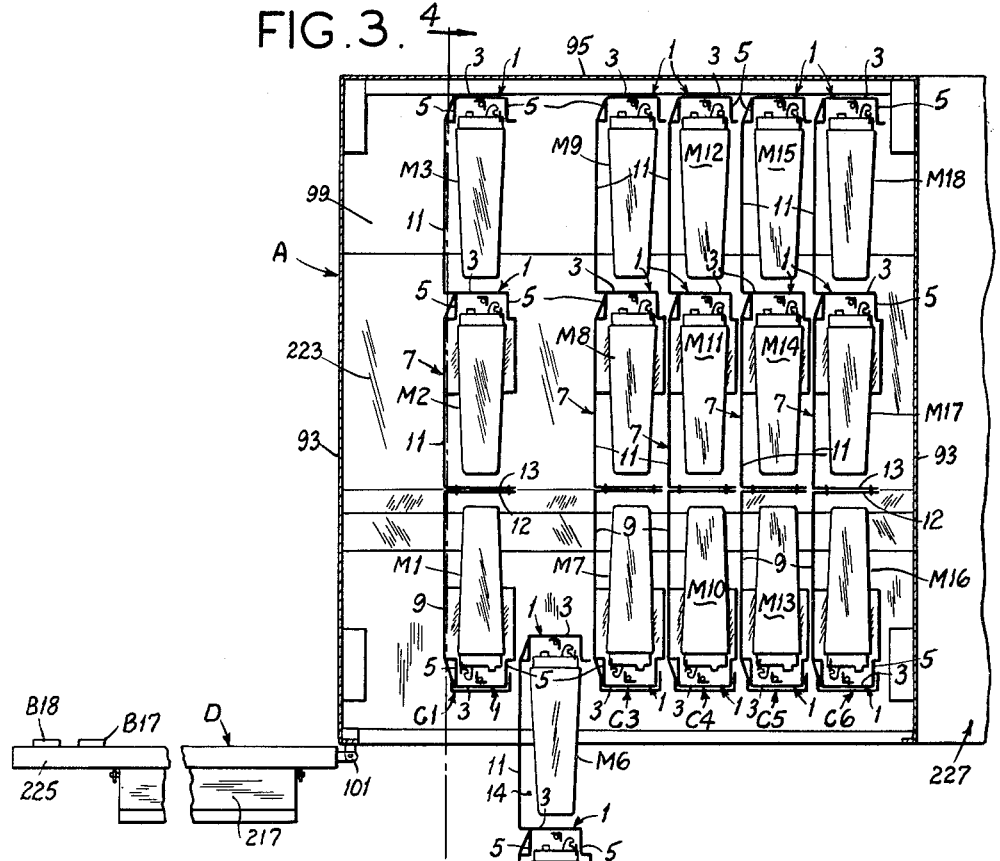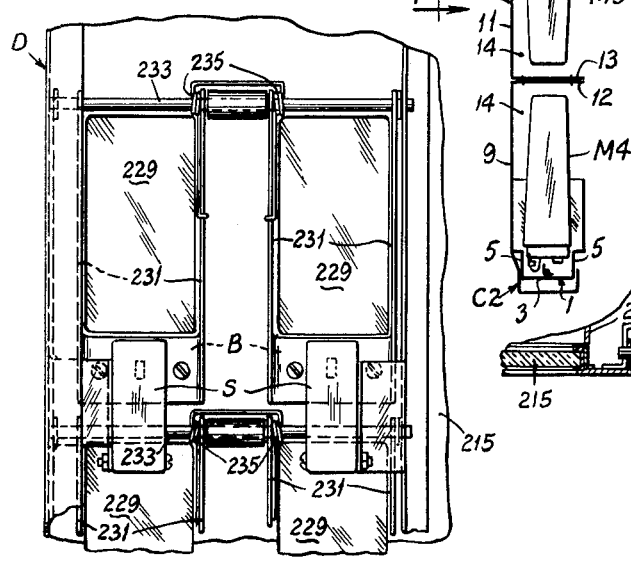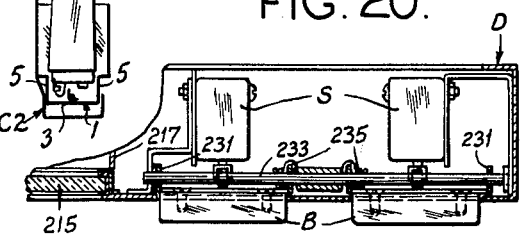

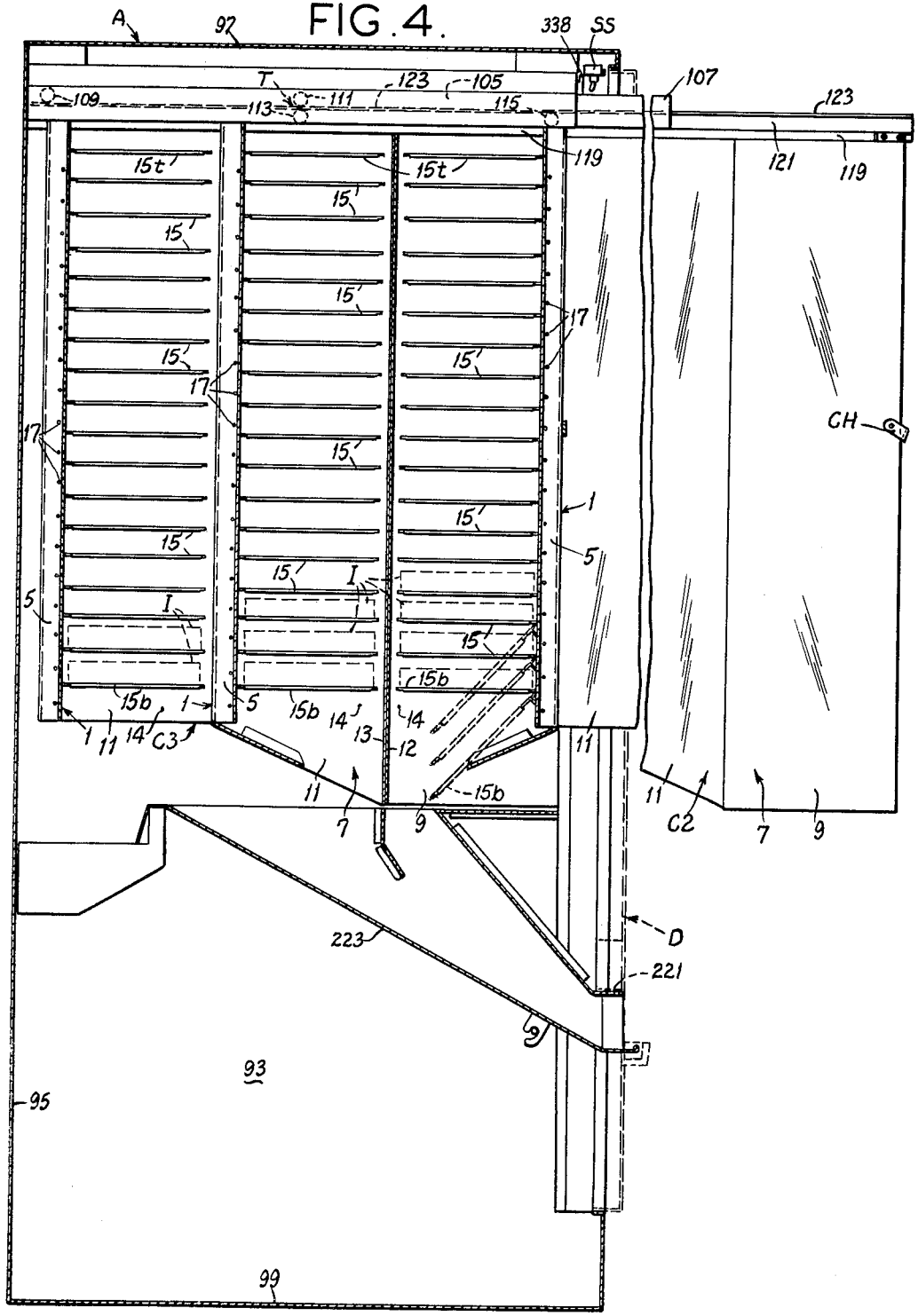

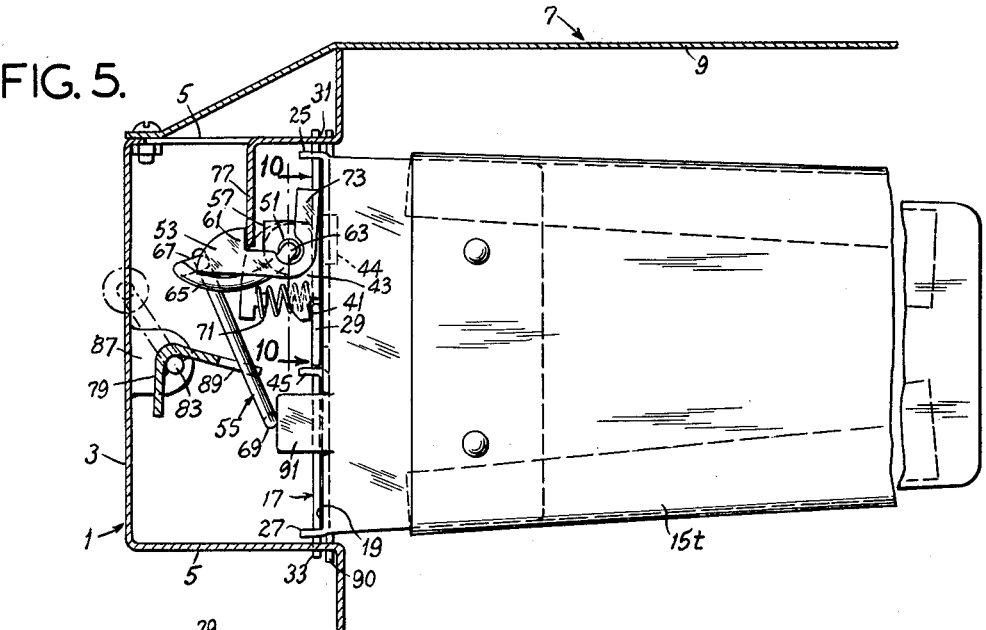

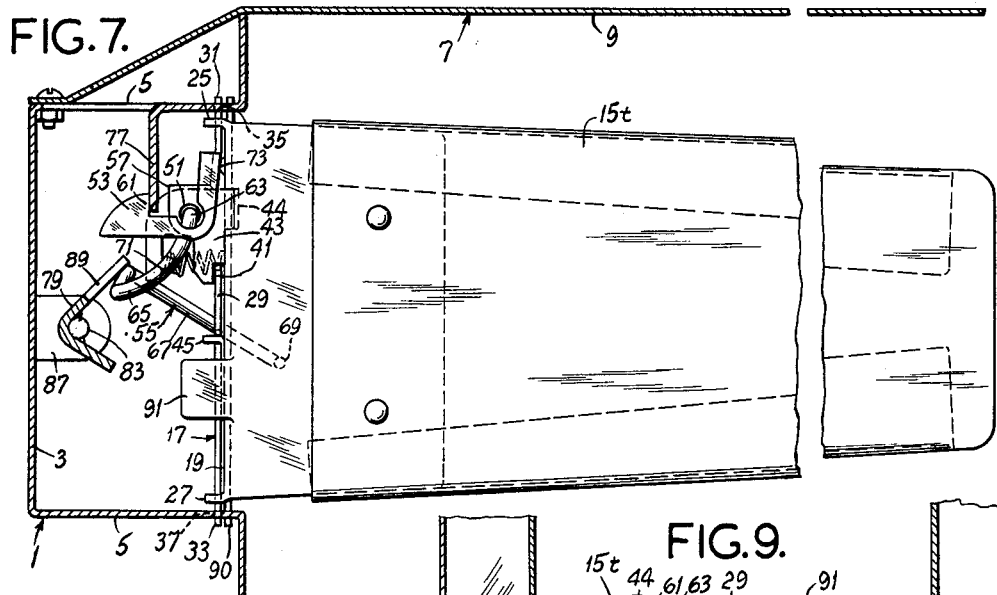
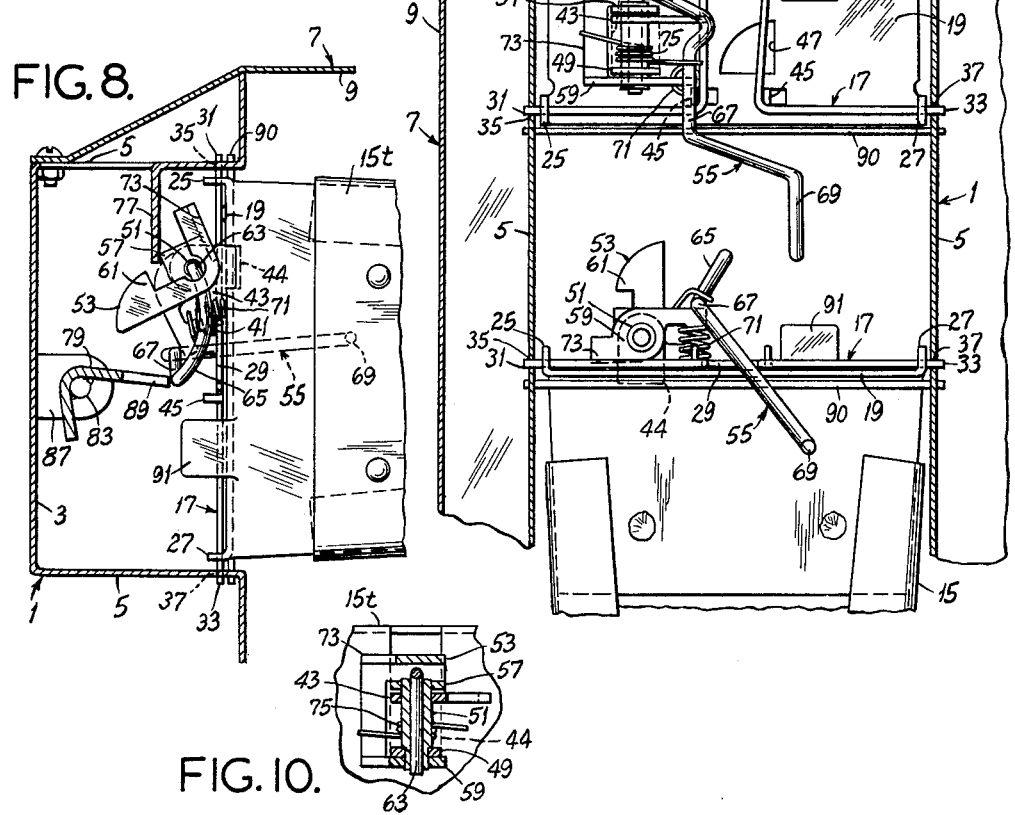

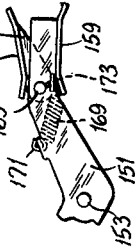
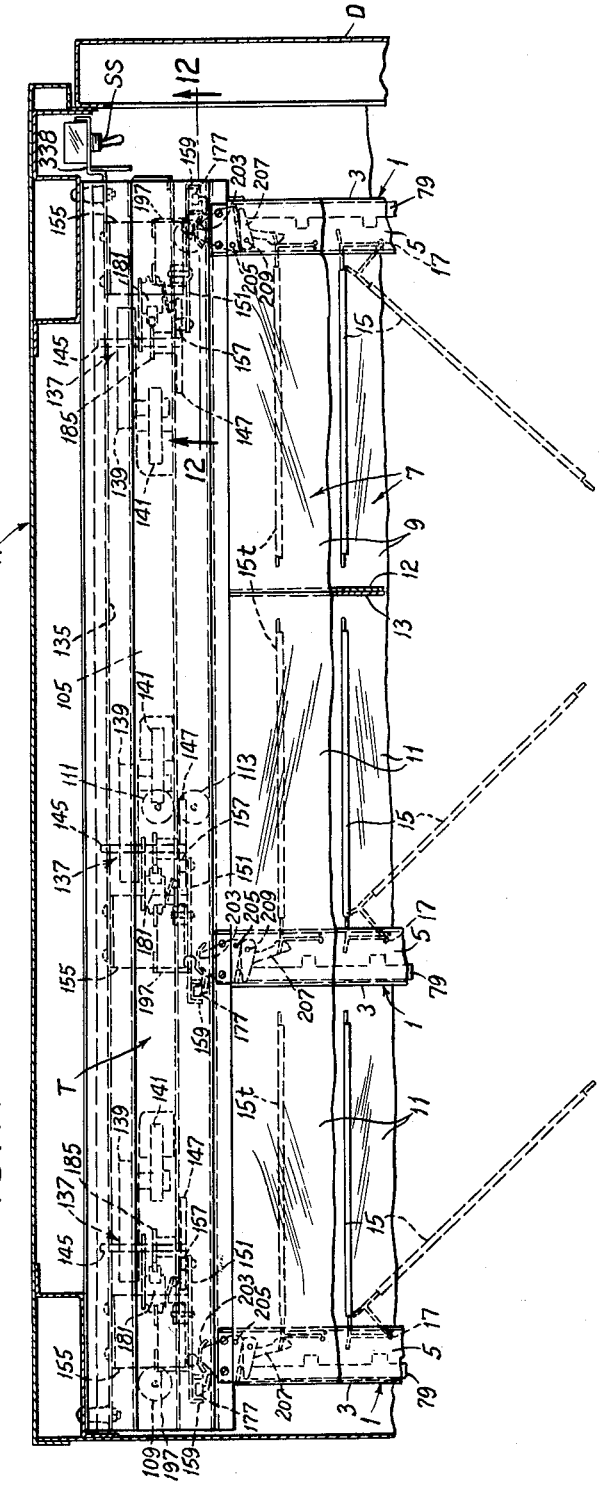
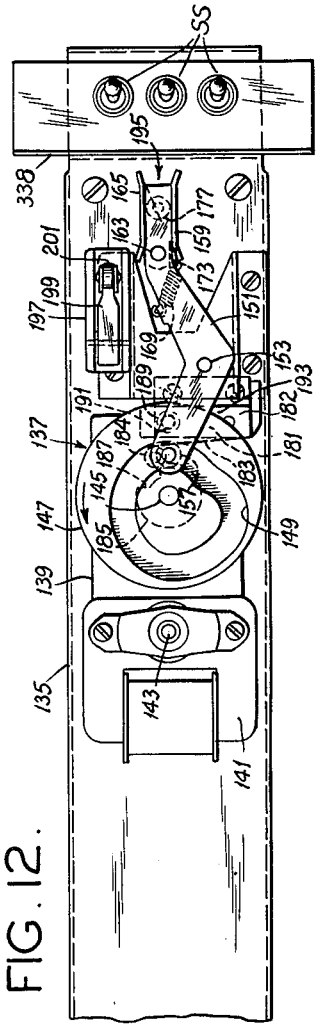

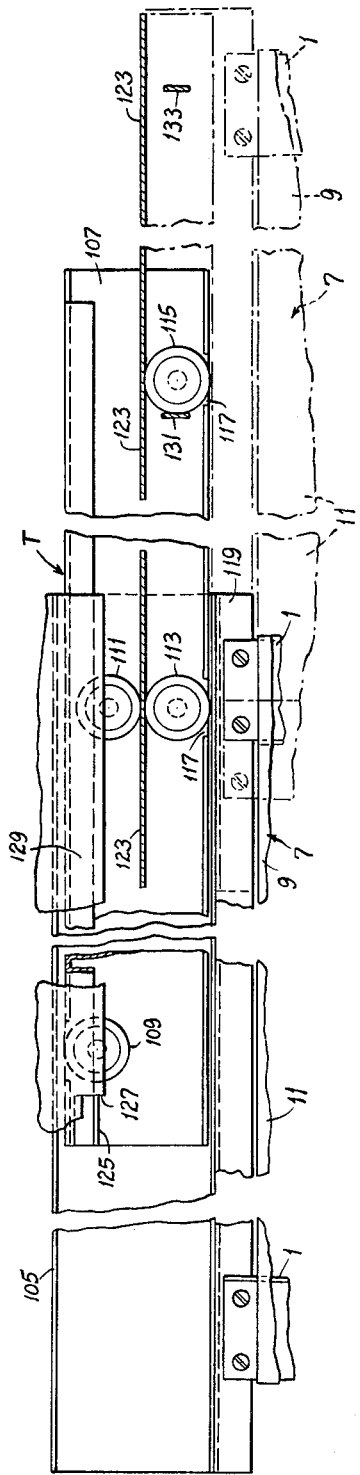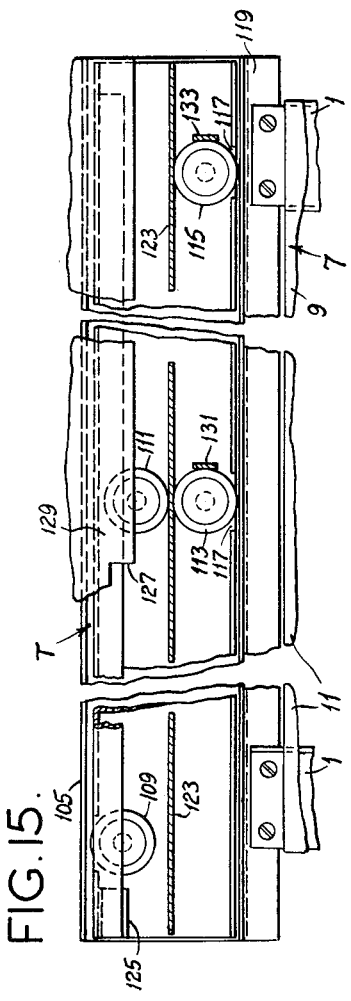

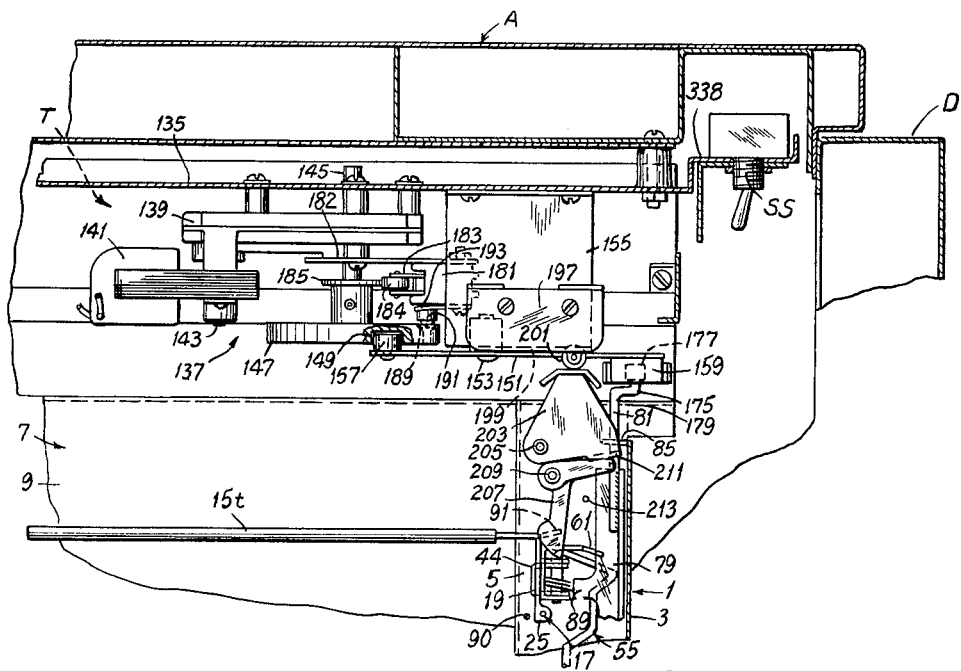

FIG. 22.

United States Patent Office

3,167,215
Patented Jan. 26, 1965

3,167,215
VENDING MACHINE
Alvin W. Holstein, Lemay, Clifford B. Adams, Bellefontaine Neighbors, and Charles D. Visos, St. Louis, Mo., assignors, by mesne assignments, to Universal Match Corporation, Ferguson, Mo., a corporation of Delaware
Filed June 6, 1960, Ser. No. 34,112
10 Claims. (Cl. 221—6)

This invention relates to vending machines, and more particularly to a vending machine of a type which may be referred to as a merchandizer for vending various items of merchandise, such as packaged wearing apparel.

Among the several objects of the invention may be noted the provision of a vending machine of the class described having a plurality of magazines or dispensers each adapted to hold a stock of items, and having a control system adapted to permit a series of the magazines or dispensers to be stocked with the same item of merchandise (for example, with one particular size of an item of clothing, such as men's underwear) and to provide for vending from the first magazine or dispenser in the series until it is emptied, then from the second until it is emptied, then from the third until it is emptied, and so on throughout the series; the provision of a vending machine such as described having a purchaser-operable control for each magazine or dispenser, and having transfer controls adapted to be set in a first position for effecting vending from each magazine or dispenser only in response to operation of the respective purchaser-operable control thereby to permit each dispenser to be stocked with a different item of merchandise, and adapted to be set in a second position for effecting vending from the first magazine or dispenser in the series until it is emptied, then from the second until it is emptied, and so on throughout the series in response to operation of any one of the purchaser-operable controls thereby to permit all dispensers in the series to be stocked with the same item of merchandise; and the provision of a vending machine such as described which is reliable in operation. Other objects and features will be in part apparent and in part pointed out hereinafter.

The invention accordingly comprises the constructions hereinafter described, the scope of the invention being indicated in the following claims.

In the accompanying drawings in which one of various possible embodiments of the invention is illustrated, FIG. 1 is a perspective of a vending machine of this invention;

FIG. 2 is a front elevation of the machine with a door of the cabinet of the machine in open position, parts being broken away to reduce the width of the view;

FIG. 3 is a horizontal section taken on line 3—3 of FIG. 2, and illustrating a column of the machine pulled out to loading position;

FIG. 4 is a vertical cross section taken on line 4—4 of FIG. 3;

FIG. 5 is an enlarged fragment of FIG. 3, broken away to reduce the width of the view;

FIG. 6 is a side elevation of FIG. 5;

FIG. 7 is a view corresponding to FIG. 5 showing a moved position of parts;

FIG. 8 is a fragment of FIG. 7 illustrating a further moved position of parts;

FIG. 9 is a vertical section taken on line 9—9 of FIG. 6, and drawn with the lowermost shelf appearing as if it were hanging vertically downward rather than angled as in FIG. 6;

FIG. 10 is a detail section taken on line 10—10 of FIG. 5;

FIG. 11 is an enlargement of the upper part of FIG. 4;

FIG. 12 is an enlarged section taken on line 12—12 of FIG. 11;

FIG. 13 is a fragment of FIG. 12 illustrating a moved position of parts;

FIG. 15 is a vertical section taken on line 15—15 of FIG. 14;

FIG. 16 is a view similar to FIG. 15 showing an extended position of parts;

FIG. 17 is a vertical section taken on line 17—17 of FIG. 14;

FIG. 18 is a view similar to FIG. 17 showing a moved position of parts;

FIG. 19 is an enlarged fragment of FIG. 2 showing certain purchaser-operable push buttons;

FIG. 20 is a horizontal section taken on line 20—20 of FIG. 1; and

FIGS. 21 and 22 are wiring diagrams.

Corresponding reference characters indicate corresponding parts throughout the several views of the drawings.

Figure 1:
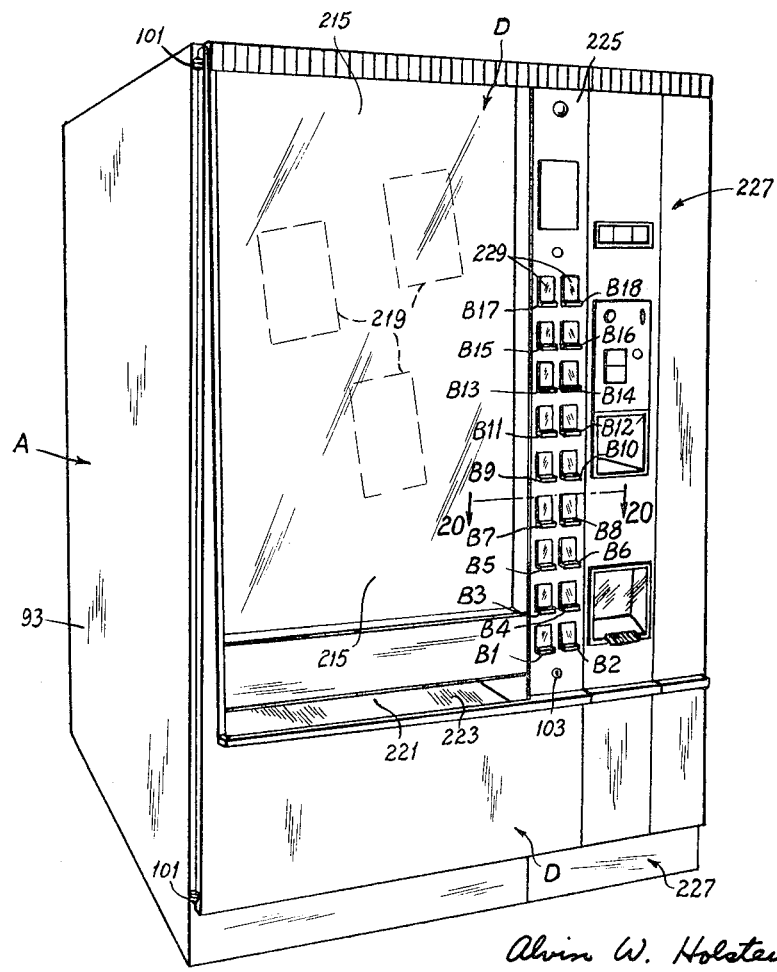

Referring to the drawings, first more particularly to FIGS. 1–4, a vending machine of this invention is shown to comprise a cabinet A having a front door D. The door is shown as hinged at its left side to the cabinet to be swingable outward away from the cabinet on a vertical axis. The machine further comprises a plurality of vending columns, each generally designated by the letter C. Six such columns are shown, and these are specifically designated C1–C6. These six columns are identical, each comprising a plurality of magazines each generically designated by the letter M. As herein illustrated, each column comprises three magazines. Thus, there are eighteen magazines in the machine, and these are specifically designated M1 to M18. Magazines M1 to M3 are grouped in column C1, magazines M4 to M6 are grouped in column C2, etc. Each magazine is adapted to hold a stock of items I to be vended. Each item I may, for example, be an item of men's underwear packaged in a carton. Means is provided for mounting columns C1–C6 (each comprising three magazines) for individual movement thereof from a position within the cabinet to a loading position outside the cabinet when door D is open. FIG. 3 shows column C2 in loading position. The mounting arrangement is such that when in the cabinet, columns C1–C6 are positioned side-by-side closely adjacent one another for maximum utilization of space in the cabinet. The columns and magazines are so constructed that any given magazine is adapted to be loaded with items from one side of the magazine (its right side as herein illustrated) when the column including that magazine is in loading position. Each magazine has an actuating means associated therewith for effecting the dispensing of items therefrom, as will be made clear.

Referring more particularly to FIG. 3, it will be observed that, as to each of columns C1–C6, the three magazines thereof are located one behind another. Thus, as to column C1, magazine M1 is at the front, M2 is behind M1, and M3 is at the rear behind M2; as to column C2, magazine M4 is at the front, M5 is behind M4, and M6 is at the rear behind M5. The arrangement as to the other columns will be apparent. The magazines are all essentially identical, each comprising a vertical channel-section shelf support 1, the web of which is designated 3, and the side flanges of which are designated 5. As to each of columns C1–C6, the shelf support 1 of the front magazine of the column (such as magazine M1 of column C1) is arranged with its web 3 toward the front and its side flanges 5 extending rearward. The shelf supports 1 of the intermediate and rear magazines (such as M2 and M3 of column C1) are arranged reversely in respect to the shelf support of the front magazine; that is to say, their side flanges 5 extend forward. Each column C1–C6 comprises a vertical side wall 7 (which is at the left side of the column as herein illustrated). This side wall 7 is constituted by plates 9 and 11. The shelf support 1 of the front magazine has one side flange (its left side flange) affixed to plate 9. This plate 9 extends rearward from the channel member 1 of the front magazine, and has a laterally extending flange 12 at its rear. Plate 11 extends rearward in continuation of plate 9, having a laterally extending vertical flange 13 at the front which engages the flange 12 of plate 9. The shelf supports 1 of the intermediate and rear magazines of each column have one side flange 5 affixed to plate 11, the shelf support of the rear magazine being at the rear of plate 11 and the shelf support of the intermediate magazine being midway between the shelf support of the rear magazine and the lateral flanges 12, 13. Thus, each column C1–C6 is constituted by the assembly of plates 9 and 11 (constituting side wall 7) and the three shelf supports 1 of the three magazines in the column. Between the front shelf support 1 and the lateral wall constituted by lateral flanges 12, 13 is a space which extends from top to bottom of the column and which constitutes the chamber 14 of the front magazine. Between the intermediate shelf support 1 and lateral wall 12, 13 is a similar space which constitutes the chamber 14 of the intermediate magazine. Between the rear shelf support 1 and the intermediate shelf support 1 is a similar space which constitutes the chamber 14 of the rear magazine. As will be apparent from FIG. 3, magazine chambers 14 are all open at the right side for side loading. Each column has a handle CH at the front.

Each of the magazines M1–M18 comprises a vertical series of drop shelves pivotally mounted at one end thereof between the side flanges 5 of the respective channel-section shelf support 1 and extending into the respective magazine chamber 14. The shelves of the front magazines extend rearward, and the shelves of the rear and intermediate magazines extend forward. The shelves are located one above the other. Each shelf is adapted to occupy a horizontal article-carrying position, and to swing down from that position for dispensing the item 1 thereon. By way of example, each magazine has eighteen drop shelves. Thus, with the eighteen magazines M1–M18, the machine is adapted to be stocked with three hundred and twenty-four items. The shelves, which are all identical, are generally designated by the reference character 15, the bottom shelf being specially designated 15b and the top shelf 15t. Each shelf is pivotally mounted at its rearward end between the side flanges 5 of the respective shelf support 1 for swinging movement on a transverse horizontal axis, by means of a hinge member 17 to be described.

Each shelf, which may be made of sheet metal, has a downwardly directed flange 19 at its pivot end (see FIGS. 6 and 9). At each of the lower corners of the flange 19, and on the back of the flange, hinge eyes 25 and 27 are provided for the hinge member 17. These are ears bent from the sheet metal of the flange. Hinge member 17 comprises a piece of spring wire, bent so as to have a loop portion 29 of inverted U-shape, and horizontal hinge pin portions 31 and 33 which extend laterally outward from the ends of the sides of the loop portion. Pin 31 is slidably received in the eye 25, and pin 33 is slidably received in the eye 27. As to each of the shelves, pin 31 is slidably and rotatably received in a hole 35 in one side flange 5 of shelf support 1, and pin 33 is slidably and rotatably received in a hole 37 in the other side flange 5 of the shelf support.

The loop 29 extends upward on the back of the shelf flange 19 and is confined against swinging outward away from the flange 19 by having one of its sides received in a notch 41 (see FIGS. 5 and 7) in the upper part 43 of a C-shaped bracket 44 mounted on flange 19. Part 43 projects rearward from the back of the flange 19. The lower end portion of the loop is received between tangs 45 which project rearward from the back of flange 19. The flange 19 has an opening 47 for access to the other side of the loop from the front of flange 19. The arrangement is such that a tool, such as a screw driver, may be inserted in the opening 47 from the front for pushing the accessible side of the loop toward its other side to retract the pin 33 from the hole 37 for removal of the shelf from between the side flanges 5 of shelf support 1.

Bracket 44 has a lower part 49 projecting from the back of the shelf. Bracket parts 43 and 49 carry a metal bushing 51 (see FIG. 10, particularly) for the pivotal mounting on the back of the flange 19 of a catch 53 and a trip 55 for the catch. The bushing extends parallel to the flange 19 in a plane perpendicular to the flange 19, being received in suitable openings in the bracket parts and having its ends projecting therefrom. The catch 53 comprises a sheet metal stamping having an ear 57 overlying the upper bracket part 43. This ear is provided with an opening receiving the upper end of the bushing 51. The catch is also formed to have a bottom arm 59 underlying the lower bracket part 49 and provided with an opening receiving the lower end of the bushing. Above the ear 57, the catch has an upper arm 61 in the form of a hook. The trip 55 consists of a length of metal rod bent to have a portion 63 which is rotatably received in the bushing 51, a laterally projecting upper arm 65, a portion 67 extending downward from the outer end of arm 65, and an angled feeler arm 69 at the lower end of portion 67 below the level of the bottom of the flange 19.

The catch 53 is biased in clockwise direction as viewed in FIGS. 5, 7 and 8 by a spring 71 to the latching position shown in FIGS. 5 and 7 wherein the hook 61 extends back generally perpendicular to the flange 19. This position of the catch is determined by engagement of a portion 73 of the catch with the back of the flange 19. The portion 67 of the trip 55 is engageable with the bottom arm 59 of the catch. The trip is biased in counterclockwise direction as viewed in FIGS. 5, 7 and 8 by a spring 75. The bias of spring 75 is weaker than that of spring 71.

The hook 61 of the catch 53 of each shelf is engageable with a lug 77 which extends inward from the adjacent side flange 5 of the channel member 1. There is a separate lug 77 for each catch, the lugs being formed by striking inward portions of this side flange 5. With a catch in the latching position as shown in FIGS. 5 and 7 and with the respective hook 61 engaging the respective lug 77, the respective shelf is held latched in the horizontal article-carrying position such as is shown in FIG. 4 for all the shelves and as shown in FIG. 6 for the two top shelves.

For operating the trips 55 to operate the catches 53 to release the shelves, there is provided a rotary member 79 which extends vertically within the space in shelf support 1 between the pivot ends of the shelves and web 3 of shelf support 1. This member 79 consists of a sheet metal angle bar having pivot pins 81 and 83 welded to its upper and lower ends. The upper pin 81 is journaled in a lug 85 on the web of shelf support 1 at its upper end and the lower pin 83 is journaled in a lug 87 on the web of the shelf support at its lower end. The bar 79 has a plurality of fingers 89 for engagement with the lateral arms 65 of the trips 55. The drop of each shelf is limited by a stop 90.

On the back of the flange 19 of each shelf is a lug 91. This may be struck from the sheet metal of the flange. As to each shelf (except the uppermost shelf), when it is held by its catch 53 in its raised article-carrying position, its lug 91 engages the feeler 69 of the trip 55 of the next shelf above to hold this trip in a retracted position such as is shown for the shelf 15t in FIG. 5. As to each shelf (except the lowermost shelf), its trip 55 is released for movement under the bias of spring 75 from the retracted position to an operative position such as is shown in FIG. 7 when the next shelf below is released from its raised article-carrying position and swings downward. When a trip 55 is in its retracted position, its lateral arm 65 lies clear of the path of movement of the respective finger 89 on the trip operating bar 79. When a trip 55 is in its operative position (the shelf which carries the trip being in the raised position), the lateral arm 65 of the trip is positioned for engagement by the respective finger 89 on the bar 79 (see FIG. 7).

The cabinet A has side walls 93, a rear wall 95, a top wall 97 and a bottom wall 99. The hinge for door D is indicated at 101. It will be understood that a lock 103 is provided for locking the door closed. Each of the columns C1–C6 is suspended from the top of the cabinet by track means generally designated T in such manner as to permit each column to slide substantially completely out of the front of the cabinet when the door D is open. The track means for each of columns C1–C6 are identical, each comprising a pair of fixed channel-section outer rails 105 (see FIGS. 14–16) secured to the top wall of the cabinet within the cabinet, arranged vertically with the open sides of the channel sections opposed one to the other, and extending from front-to-rear of the cabinet. Slidable in the outer rails 105 are extensible channel-section inner rails 107. Each of the inner rails carries an upper rear roller 109, upper and lower intermediate rollers 111 and 113, and a lower forward roller 115 (see FIGS. 15 and 16). These rollers project through openings such as indicated at 117 in the flanges of inner rails 107 and engage the flanges of outer rails 105.

Each of the columns C1–C6 has a horizontal top plate 119 on top of which is secured a horizontal channel member 121. The latter has horizontal flanges 123 extending laterally outward from the upper edges of its side flanges which ride on rollers 113 and 115 and between rollers 111 and 113. The inner rails 107 are adapted to slide forward out of the outer rails 105 from the retracted position of FIG. 15 to the extended position of FIG. 16, the latter being determined by engagement of lugs 125 on the inner rails with shoulders 127 at the rearward end of stop plates 129 carried by the fixed outer rails 105. In their extended position, the inner rails 107 are cantilevered outward from the cabinet, rollers 111 and 113 are located adjacent the forward ends of the outer rails 105, and rear rollers 109 are engageable with the upper horizontal flanges of the outer rails to prevent the inner rails from tipping downward. Each column C1–C6 is suspended from the respective inner rails 107 by reason of the flanges 123 of channel member 121 bearing on rollers 113 and 115, and is slidable relative to the inner rails between a retracted position wholly within the cabinet and a loading position projecting outward beyond the cabinet (and projecting forward beyond the extended inner rails 107) and determined by engagement of lugs 131 on channel members 121 with the rear of rollers 115 (see FIG. 16). The retracted position of each column is determined by engagement of lugs 131 with the front of rollers 113 and by the engagement of additional lugs 133 on channel members 121 with the front of rollers 115 (see FIG. 15).

Secured at the top of the cabinet between each pair of outer rails 105 is a horizontal channel member 135. Each of these channel members 135 carries three units, each generically designated 137, for actuating the trip-operating bars 79 of the three magazines of the respective column. Each unit 137 (see FIGS. 12 and 17) comprises a gear box 139 suspended from the channel member 135. Suspended from the gear box is an electric motor 141. The shaft of the motor is indicated at 143. This drives a vertical camshaft 145 via reduction gearing (not shown) in box 141. The camshaft has a plate cam 147 at its lower end. This cam has a heart-shaped cam groove 149 in its bottom face (see FIG. 12). A lever 151 is pivoted intermediate its ends at 153 on the bottom of a U-shaped bracket 155 depending from channel member 135. This lever 151 has a follower roll 157 at one end received in the cam groove 149. At its other end, the lever has a downwardly extending side flange 159. An auxiliary lever 161 pivoted at 163 on lever 151 has a downwardly extending side flange 165 on the opposite side of lever 151 from flange 159. The auxiliary lever 161 is biased in the direction for engagement of its side flange 165 with the edge of the lever 151 opposite flange 159 by a spring 169 having one end connected at 171 to lever 151 and its other end connected at 173 to lever 161. The upper pivot pin 81 of each trip-operating bar 79 is formed as a crank 175 at its upper end, this crank being provided with a roller 177 adapted for reception between flanges 159 and 165. The cranks extend through openings 179 in members 119 and 121. The arrangement is such that upon a revolution of the camshaft 145 and cam 147, lever 151 is swung in one direction to rotate the trip-operating bar 79 from its initial FIG. 5 position to its FIG. 7 position and then is swung back in the opposite direction to return the trip-operating bar 79 to its initial FIG. 5 position.

A switch 181 is mounted on the bottom of a horizontal plate 182 extending from gear box 139. This switch has an operating arm 183 carrying a roller 184 at its free end. The arm is biased outward by spring means in the switch 181 for engagement of roller 184 with a disk 185 fixed on camshaft 145 above cam 147. This disk 185 has a peripheral notch 187. Cam 147 has a hole 189 adapted to receive a button 191 on a spring detent 193. Cam 147 and disk 185 have a rest position determined by engagement of the button 191 on the detent 193 in the hole 189. In the rest position of the cam and disk, lever 151 is positioned as shown in FIG. 12 with the channel 195 defined by flanges 159 and 165 in a central position. Roller 184 on switch arm 183 bears on the periphery of disk 185 just off one end of notch 187 which constitutes its trailing end. When the motor 141 is energized, the cam 147 and disk 185 rotate in the direction indicated by the arrow in FIG. 12. Near the end of a revolution, switch arm 183 moves outward away from switch 181, roller 184 moving out into the notch. This instigates deenergization of the motor 141, as will be made clear, and the camshaft 145 and the cam 147 and disk 185 complete a single revolution, returning to their rest position of FIG. 12, detent button 191 entering the hole 189 in cam 147 to bring the parts to a stop in the rest position. Upon a revolution of cam 147 in the direction indicated by the arrow in FIG. 12, lever 151 is swung clockwise as viewed in FIG. 12 through an angle of about 30°, and then returned counterclockwise back to its rest position. Upon such swinging of the lever, the trip-operating bar 79 is rotated from its FIG. 5 rest position to its FIG. 7 position, and then back to its FIG. 5 rest position. FIG. 12 shows a unit 137 for a front magazine of a column. It will be understood that since the intermediate and rear magazines of each column are reversed in position as regards the front magazine, the units 137 for the intermediate and rear magazines are reversed in position as regards the unit 137 for the front magazine. Otherwise, the units 137 for the intermediate and rear magazines are identical to unit 137 shown in FIG. 12.

Associated with each unit 137 is an empty switch 197 for the respective magazine (see FIGS. 17 and 18). This empty switch is mounted on one side of the U-shaped bracket 155. It has an operating arm 199 with a roller 201 at the free end of the arm. These are at the bottom of the switch. The arm is biased downward by spring means in the switch. It is held up by a lever 203 pivoted at 205 on a side flange 5 of shelf support 1 when the top shelf 15t of the respective magazine is in its horizontal position (see FIG. 17). Lever 203 is controlled by a bellcrank 207 pivoted at 209 on the same side flange 5 of shelf support 1. One arm of the bellcrank 207 is engageable with a tang 211 on lever 203. The other arm of the bellcrank is engageable by the back of the flange 19 of the top shelf 15t when the latter is in horizontal position, the arrangement being such that the bellcrank is then held by the top shelf 15t to hold lever 203 in its raised position of FIG. 17 to hold up switch arm 199. When the top shelf 15t drops (which means that the magazine is empty), the bellcrank is released to swing under gravity bias to its FIG. 18 position, determined by engagement with a stop pin 213, and lever 203 is released to swing under gravity bias to its FIG. 18 position, thereby releasing switch arm 199 so that the latter swings downward.

The door D of the cabinet A has a large window 215 (see FIG. 1) behind which is a panel 217 on which samples 219 of merchandise stocked in the machine may be displayed. Below the window 215, the door has an access opening 221 extending the full width of the six columns C1–C6. Within the cabinet below the columns C1–C6 is a chute 223 (see FIG. 4) down which items I dropping off the shelves of any magazine slide down to the access opening 221. The door is wider than the cabinet and the right side portion 225 of the door overlaps to some extent a money-handling unit 227 at the right side of the cabinet. At the right side of the door (in the portion 225 thereof which overlaps the money-handling unit 227) is an array of push buttons each generically designated by the letter B. There are eighteen such push buttons, one for each of the eighteen magazines M–M18, arranged in a vertical series of nine pairs, and specifically designated B1 to B18. Button B1 is related to magazine M1, button B2 is related to magazine M2, etc. Above each button is a small window 229 through which may be displayed a printed card or the like denoting the merchandise in the respective magazine and the price thereof. Thus, assuming the machine is stocked with men's shorts of various sizes, samples thereof may be displayed in the large window 215. The cards in the small windows 229 will indicate the size and the price of shorts stocked in the respective magazines. Each of the buttons B1–B18 is adapted to be pushed in by a purchaser to actuate a switch generically designated by letter S, there being eighteen of these switches. Each button has upwardly extending side arms 231 on the inside of the door pivoted at their upper ends on a horizontal rod 233, and is biased outward by a spring 235 (see FIGS. 19 and 20).

Figure 21:
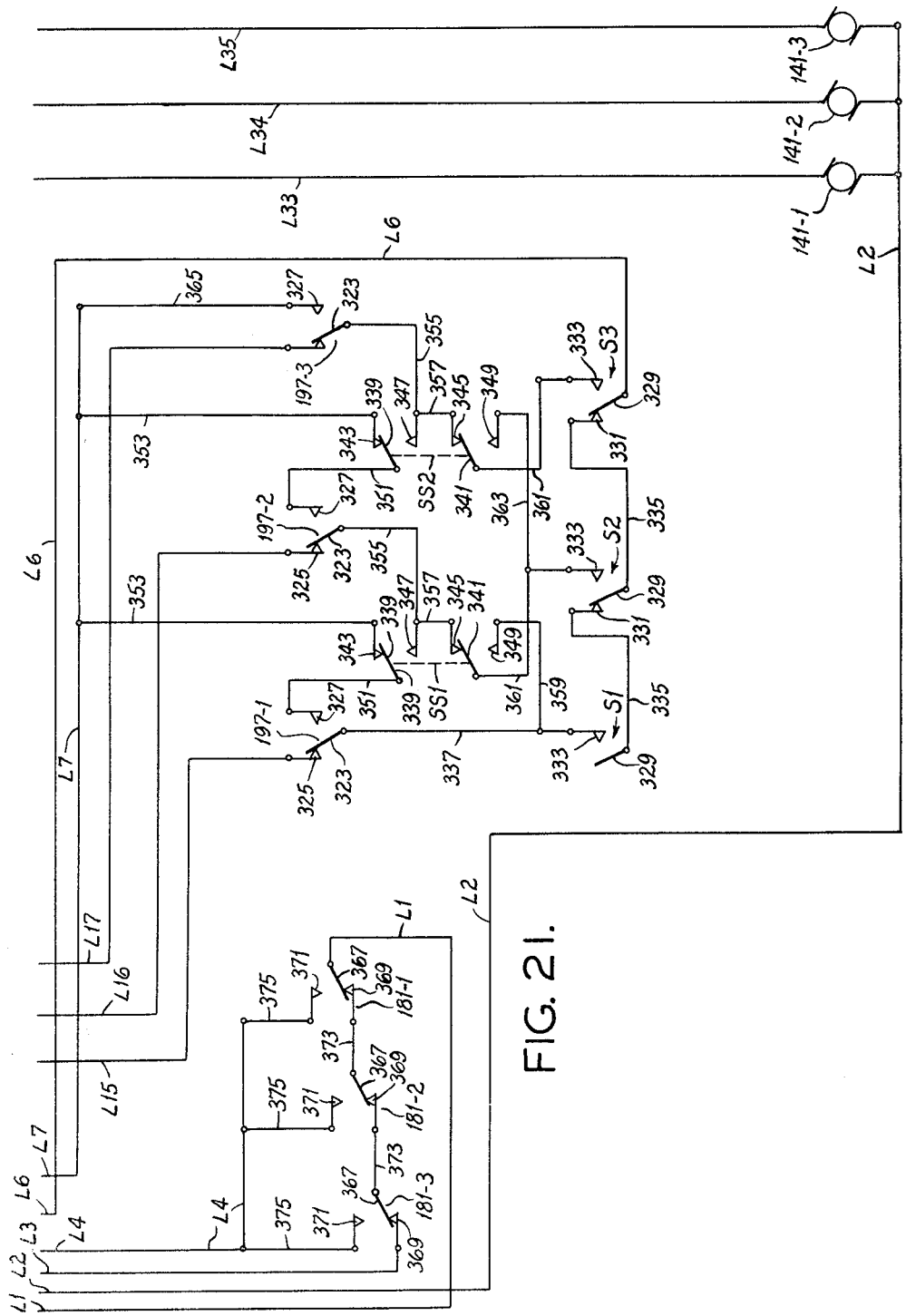
Figure 22:
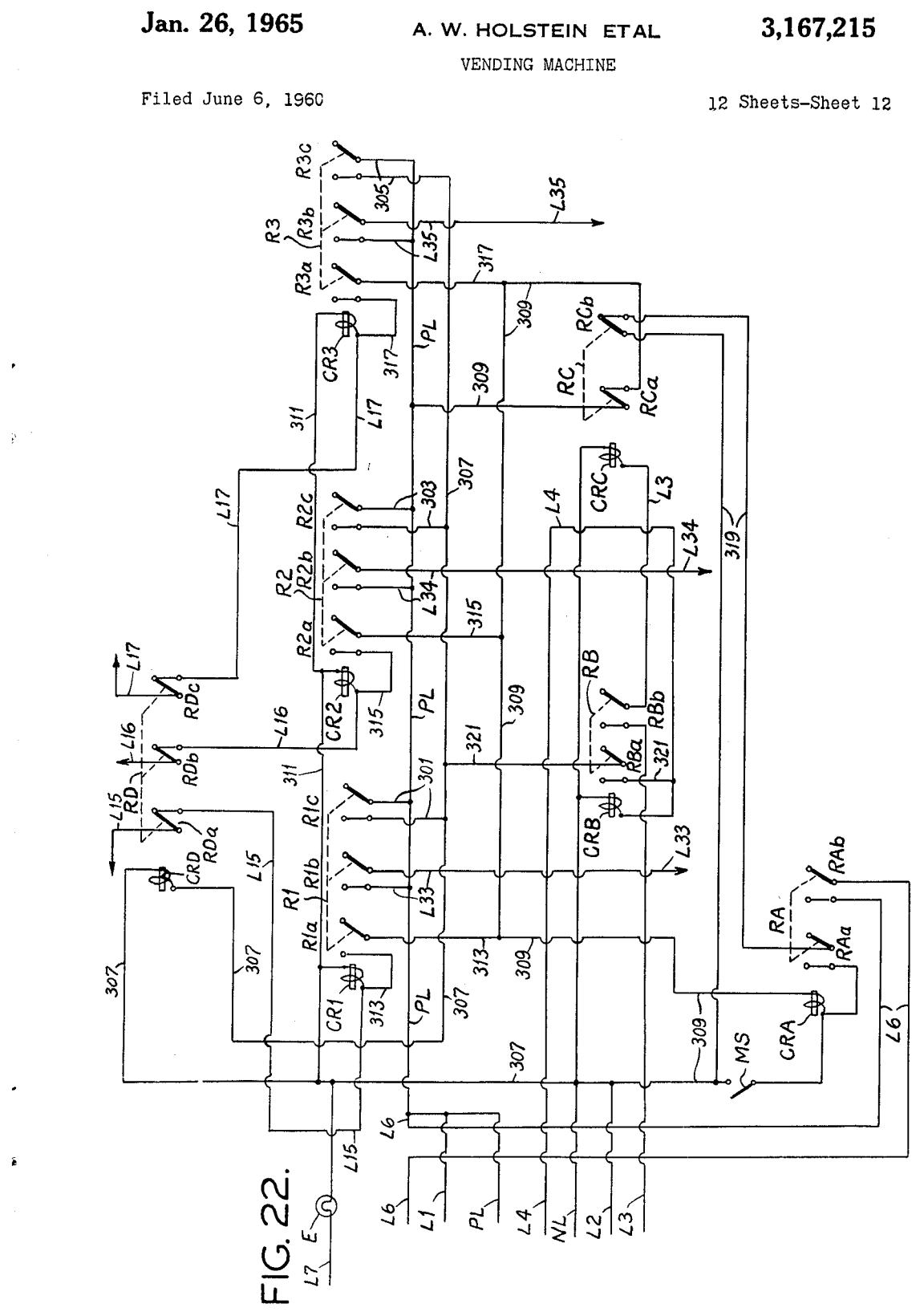

The electrical control system of the machine is illustrated in FIGS. 21 and 22. For condensation of the drawings and simplification of the description, FIGS. 21 and 22 show only those components of the system for controlling the operation of the motors for the first three magazines M1, M2, M3. Certain of the components shown in FIG. 22 are also utilized in controlling the motors of magazines M4–M18. The additional components required for controlling the motors for magazines M4–M18 are simply additive to those shown in FIGS. 21 and 22, and identical to certain components shown in FIGS. 21 and 22, as will be made clear.

FIG. 22 shows the portion of the electrical control system in the money-handling unit 227. This comprises push-button-responsive relays R1–R3, controlled by the switches S1, S2 and S3 which are operated by push buttons B1, B2 and B3, respectively, and four additional relays RA, RB, RC and RD. Here it will be understood that, with eighteen magazines, and eighteen push buttons and switches, money-handling unit 227 will actually include eighteen relays like R1, R2 and R3. Each of relays R1, R2 and R3 is a single-throw triple-pole relay. Thus, relay R1 comprises a coil CR1, and three normally open switches R1a, R1b and R1c. Relay R2 comprises a coil CR2, and three normally open switches R2a, R2b and R2c. Relay R3 comprises a coil CR3, and three normally open switches R3a, R3b and R3c. Relay RA is a single-throw double-pole relay comprising a coil CRA, and two normally open switches RAa and RAb. Relays RB and RC are single-throw double-pole relays. Relay RB has a coil CRB and two normally open switches RBa and RBb. Relay RC has a coil CRC and two normally closed switches RCa and RCb. Relay RD, as shown in FIG. 22, is a single-throw triple-pole relay having a coil CRD, and three normally closed switches RDa, RDb and RDc. However, it will be understood that with eighteen magazines relay RD will actually have eighteen switches in all.

A main power line PL leads into unit 227, and a neutral line NL leads out of unit 227. Switch R1b is connected in a line L33 extending from power line PL. Switch R2b is connected in a line L34 extending from power line PL. Switch R3b is connected in a line L35 extending from power line PL. Here it will be understood that, in the complete electrical control system, there are eighteen relays like R1, R2 and R3 and eighteen lines like L33, L34 and L35 extending from these relays. Switches R1c, R2c and R3c are connected in branch lines 301, 303 and 305 connected to a common line 307 which includes coil CRD of relay RD and which connects to neutral line NL. Normally closed switch RCa of relay RC is connected in series with coil CRA of relay RA and a money switch MS in a line 309 connected between power line PL and neutral line NL. Switch MS is normally open, being closed in response to insertion by a purchaser into money-handing unit 227 of a sufficient amount of money. When switch MS closes, relay coil CRA is energized.

Switches RDa, RDb and RDc of relay RD are respectively connected in series with coils CR1, CR2 and CR3 of relays R1, R2 and R3 via lines L15, L16, L17 and a common return line 311 connected to line 307 and thus connected to neutral line NL. Switches R1a, R2a and R3a are connected in holding circuits 313, 315 and 317 for relay coils CR1, CR2 and CR3, respectively, branching off from line 309, and each being thereby in series with switch RCa of relay RC. A holding circuit 319 is provided for relay coil CRA. This holding circuit includes normally closed switch RCb and normally open switch RAa and is adapted to shunt money switch MS. Switch RBb of relay RB and coil CRC are connected in series with one another in a line L3 which is connected to neutral line NL. Coil CRB is connected in a line L4 which is connected to neutral line NL. A holding circuit 321 for coil CRB is connected between lines 307 and L4 and includes switch RBa. A line L1 is connected directly to power line PL. A line L2 is connected to line 307, hence to neutral line NL. A line L6 including switch RAb is connected to power line PL. A line L7 including an "empty" signal lamp E is connected to line 307.

Now referring to FIG. 21, which shows the portion of the electrical control system in cabinet A, the motors for magazines M1, M2 and M3 are specially designated 141–1, 141–2 and 141–3. Lines L33, L34 and L35 are respectively connected to one terminal of each of these motors. Line L2 is a common line for the other terminals of the motors. Here it will be understood that, with eighteen motors, there are actually eighteen lines like L33, L34 and L35 in the machine, each connected to a respective motor, and that all eighteen motors are connected to line L2. The empty switches for magazines M1, M2 and M3 are specially designated 197–1, 197–2 and 197–3 in FIG. 21. Here it will be understood that eighteen such empty switches would actually appear in FIG. 21 if the latter were expanded to show the control system for all eighteen magazines. Each empty switch is a double-throw switch having a blade 323 normally closed on a first contact 325 and movable to close on a second contact 327 when the last item in the respective magazine is dispensed by dropping of the top shelf. Lines L15, L16 and L17 are connected to contacts 325 of empty switches 197–1, 197–2 and 197–3.

FIG. 21 also shows the purchaser-operable switches

S1, S2 and S3 (which are operated by the push buttons B1, B2 and B3). It will be understood that eighteen such switches would appear in FIG. 21 if the latter were expanded to show the control system for all eighteen magazines. Switch S1 is a single-throw normally open switch. Each of switches S2 and S3 is a double-throw switch, having a blade 329 normally closed on a first contact 331 and movable to close on a second contact 333. The purchaser-operable switches for magazines M4–M18 would be double-throw switches like S2 and S3. Line L6 is connected to the blade of the last switch. The blade of switch S1 is connected to the first contact of switch S2 by a line 335, the blade of switch S2 is connected to the first contact of switch S3 by a similar line 335 and, in the complete system for all eighteen magazines, this relationship continues all the way to the last switch (which would be switch S18). The blade of the first empty switch 197–1 is connected by a line 337 to the first purchaser-operable switch S1 for completion of an L6–L15 circuit when switch S1 is closed and the first empty switch 197–1 is in its normal position wherein its blade 323 is on its first contact 325. This L6–L15 circuit is completed via the remaining purchaser-operable switches S2 and S3.

Figure 14:
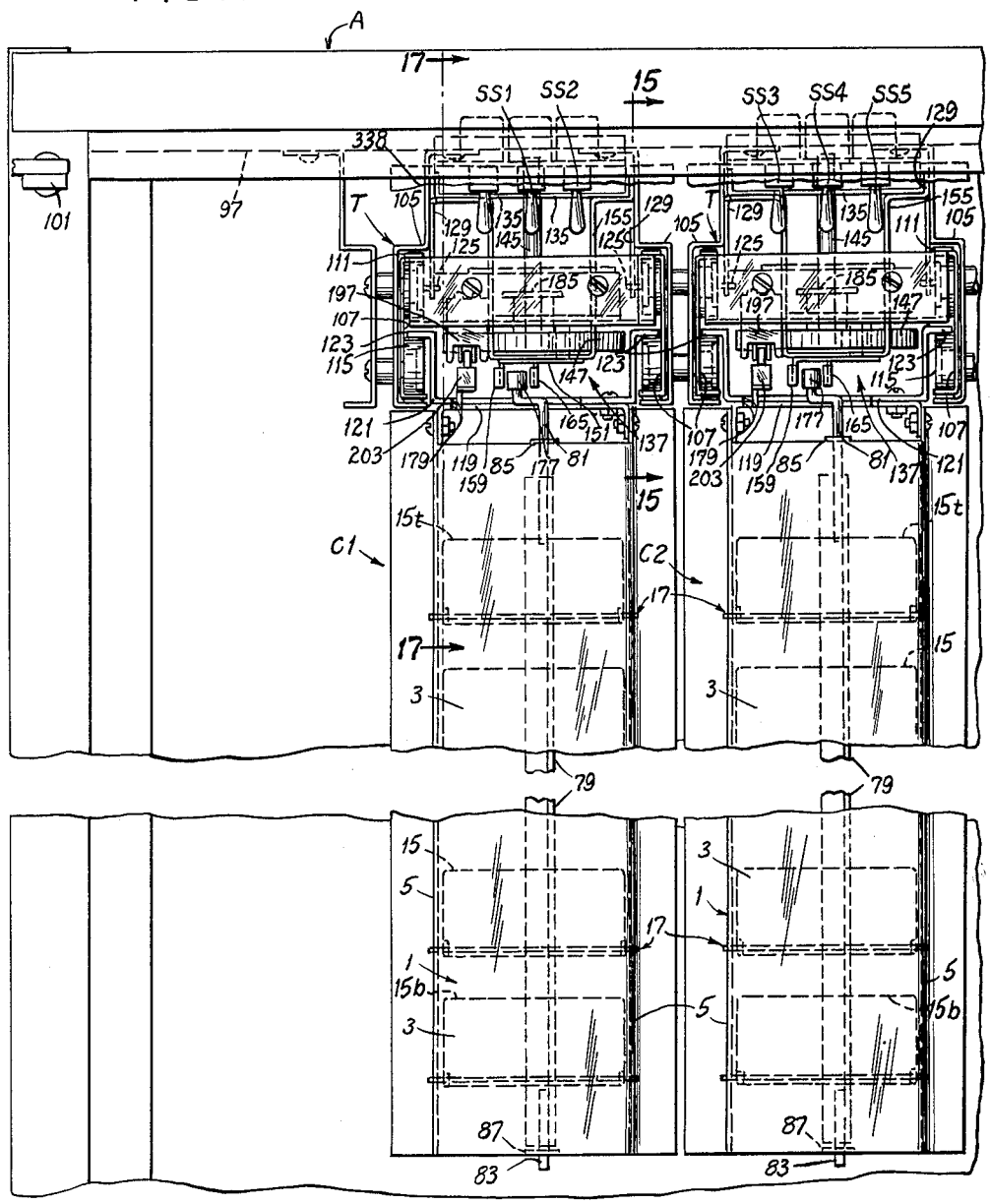
FIG. 14 is an enlarged fragment of FIG. 2.

Referring to FIGS. 2 and 14, it will be observed that at the forward end of each channel member 135 for each of columns C1–C6 there is a bracket 338 carrying three toggle switches located side-by-side. The left-hand toggle switch of the first column C1 is used for controlling certain display lamps which are not material to this invention. The remaining seventeen toggle switches are magazine transfer switches, and are designated SS1–SS17. These are manually operated double-throw double-pole switches. Each is adapted to be set either in a first position for control of each magazine solely by the related push button, or in a second position for automatically transferring vending operations from one magazine to another when the former is emptied. Thus, for example, switch SS1, when set in its second position, automatically transfers vending operations from magazine M1 to magazine M2 when magazine M1 is emptied, and allows either button B1 or B2 to be pushed in for vending from M1 or M2. Switch SS2, when set in its second position, automatically transfers vending operations from magazine M2 to magazine M3 when magazine M2 is emptied, and allows either button B2 or B3 to be pushed in for vending from M2 or M3. With both switches SS1 and SS2 set in second position, vending occurs from magazine M1 until it is empty on pushing any of buttons B1, B2 or B3, then from M2 until it is empty no matter which of these buttons is pushed, and then from M3 no matter which of these buttons is pushed. The arrangement is such that it is possible to set up the machine for vending different items from each of the eighteen magazines (in which case all switches are left in first position) or for vending the same item from any desired number of magazines. For example, when the machine is stocked to vend men's shorts, as to which size thirty-four is the fastest selling size, the first three magazines M1–M3 may be stocked with size thirty-four shorts, and switches SS1 and SS2 set for automatic transfer from M1 to M2 when M1 is empty and from M2 to M3 when M2 is empty. Push buttons B1–B3 would then be designated (by means of the cards in the small windows) as controlling the vending of size thirty-four shorts, and pushing in any one of these buttons results in dispensing from M1 until it is empty, from M2 until it is empty, and then from M3.

Referring back again to FIG. 21, only transfer switches SS1 and SS2 are shown, but it will be understood that seventeen such switches would actually appear in FIG. 21 if the latter were expanded to show the system for all eighteen magazines. Each transfer switch comprises a pair of blades 339 and 341 movable from a first position closed on contacts 343 and 345 to a second position closed on contacts 347 and 349. The blade 339 of each transfer switch is connected by a line 351 to the contact 327 of the respective empty switch. Thus, blade 339 of switch SS1 is connected to contact 327 of empty switch 197–1, etc. Contact 343 of each transfer switch is connected by a line 353 to line L7. Contact 347 of each transfer switch is connected by a line 355 to the blade 323 of the next successive empty switch. Thus, contact 347 of switch SS1 is connected to blade 323 of empty switch 197–2, etc. Contacts 345 and 347 of each transfer switch are interconnected as indicated at 357. A line 359 connects line 337 and contact 349 of switch SS1. Each transfer switch has its blade 341 connected by a line 361 to contact 333 of the next successive purchase-operable switch and by a line 363 to the contact 349 of the next successive transfer switch. Thus, blade 341 of transfer switch SS1 is connected to contact 333 of switch S2 and to contact 349 of transfer switch SS2. Contact 327 of empty switch 197–3 is shown as connected by a line 365 to line L7. Actually, in the complete circuit for all eighteen magazines, it would be connected by a line corresponding to lines 351 to the blade 339 of the next transfer switch (which would be SS3). Also, while FIG. 21 shows line L6 connected to the blade of switch S3, it will be understood that in the complete layout, L6 would be connected to the blade of a switch S18 and switches S4–S18 would be added between S3 and line L6.

FIG. 21 shows the disk-operated switches 181 for the first three magazines M1, M2 and M3, these switches here being specially designated 181–1, 181–2 and 181–3. It will be understood that eighteen such switches would appear in a full layout. Each of these switches is a double-throw switch, having a blade 367 adapted to close on either of first and second contacts 369 and 371. Line L1 is connected to the blade of the first switch 181–1 and line L3 is connected to contact 369 of the last switch. The contact 369 of each switch except the last is connected to the blade 367 of the next switch as indicated at 373, so that an L1–L3 circuit is established when all the switches are closed on contacts 369. Contacts 371 are connected as indicated at 375 to line L4.

Operation is as follows:

It will first be assumed that transfer switches SS1 and SS2 are set in the first position in which they appear in FIG. 21. Money switch MS is closed by the purchaser's insertion of an appropriate amount of money in money-handling unit 227. Upon closure of money switch MS, a circuit for relay coil CRA is completed from power line PL via line 309 including normally closed switch RCa of relay RC to neutral line NL. Relay switches RAa and RAb thereupon close. Upon closure of switch RAa, holding circuit 319 for relay RA is completed (switch RCb being closed) to shunt switch MS. Upon closure of switch RAb, line L6 is connected to the power line PL.

Now assuming that the purchaser pushes button B1 to obtain an item from magazine M1 (and assuming that there are items on all the shelves of the latter), switch S1 is closed and a circuit is thereby completed through the series of purchaser-operated switches S1, S2, etc., between lines L6 and L15 (see FIG. 21). Momentary closure of switch S1 is sufficient. Line L6 being energized and connected to line L15, a circuit is completed for relay coil CR1 (see FIG. 22) via line L15 (switch RDa being closed), and lines 311 and 307 to neutral line NL. Switches R1a, R1b and R1c thereupon close. Upon closure of switch R1a, holding circuit 313 for relay R1 is completed. Upon closure of switches R1b and R1c, lines L33 and 307 are energized. With line 307 energized, relay coil CRD is energized, and switches RDa, RDb and RDc open. With these switches open, repeated operation of button B1 or operation of other buttons is ineffective to cause any circuit changes. With line L33 energized, motor 141–1 for magazine M1 is energized to drive the cam 147 and disk 185 of the operating unit 137 for magazine M1. This results in rotation of the trip-operating bar 79 of magazine M1 from its FIG. 5 position to its FIG. 7 position and then back to its FIG. 5 position.

Assuming that all the shelves of magazine M1 are latched in their raised horizontal article-carrying position by engagement of the hooks 61 of the catches 53 with the lugs 77, the trips 55 of all the shelves, except the bottom shelf 15b, will occupy their retracted position such as is shown for the uppermost shelf 15t in FIGS. 5 and 6. The trip for the bottom shelf will occupy its operative position such as is shown for the trip in FIG. 7. The first time the trip-operating bar 79 is rotated from its retracted FIG. 5 position to its FIG. 7 position shown and then back to its retracted FIG. 5 position, the bottom shelf 15b is released and swings downward to dispense the article thereon. Release of the shelf is effected upon the return of the trip-operating bar 79 from the FIG. 7 position through a position such as shown in FIG. 8. When the bar 79 rotates in counterclockwise direction away from its retracted FIG. 5 position, the bottom finger 89 thereon engages the lateral arm 65 of the trip 55 of the bottom shelf, and rotates the trip in clockwise direction until the bottom finger 89 rides off the arm 65, whereupon the spring 75 returns the trip back to the FIG. 7 position. Now the bottom finger 89 is behind the trip arm 65, and when the bar 79 rotates back from the FIG. 7 position to the FIG. 8 position, the bottom finger 89 thereon rotates the trip counterclockwise from the FIG. 7 position to the FIG. 8 position. This counterclockwise rotation of the trip effects counterclockwise rotation of the catch 53 from the FIG. 7 position to the FIG. 8 position by reason of the engagement of the portion 67 of the trip with the bottom arm 59 of the catch, thereby rotating the hook 61 of the catch out of engagement with the lug 77 to free the shelf 15b so that it may fall downward under its own weight and the weight of the item I thereon. None of the shelves above the bottom shelf are released, however, because their trips are in retracted position.

When the bottom shelf 15b of the magazine M1 is released and swings downward, the cam 91 on the back of the flange 19 of the bottom shelf moves away from the feeler 69 of the trip 55 of the second shelf. The trip 55 of the second shelf thereupon moves under the bias of spring 75 from its retracted position to its operative position. Then the next time the trip-operating bar 79 is rotated away from and back to its retracted position upon energization of the respective motor 141-1, the second shelf is released to swing downward and dispense the item thereon. The release of the second shelf is effected in the same manner as that above described for the bottom shelf, except that it is the second finger up on the trip-operating bar 79 that effects the release. None of the shelves above the second shelf are released, however, because their trips are in retracted position. When the second shelf is released, the trip 55 of the third shelf is released, and the next time the bar 79 is operated, the third shelf is released, and so on up to the top shelf 15t.

As the disk 185 approaches the end of a revolution, the roller 184 on the end of the operating arm 183 for the disk-operated switch 181-1 associated with magazine M1 drops into the notch 187 in the disk (see FIG. 12), and the blade 367 of this switch opens from contact 369 and closes on contact 371 (see FIG. 21). This connects line L1 energized directly from power line PL) to line L4. Coil CRB of relay RB is thereupon energized via line L4, and switches RBa and RBb of this relay close. Closure of switch RBa establishes holding circuit 321 for coil CRB. Roller 184 moves out of notch 187 as the disk 185 completes a revolution so that switch 181-1 returns to its initial position with its blade 367 on contact 369. Accordingly, line L3 is energized from line L1. With line L3 energized and switch RBb of relay RB closed, coil CRC of relay RC is energized. This opens switches RCa and RCb. This deenergizes holding circuit 319 for relay CRA, and the latter opens. It also deenergizes holding circuit 313 for relay R1 and the latter opens. With R1 open, switches R1b and R1c are open to deenergize lines L33 and 307, with the result that motor 141-1 and relay coils CRD and CRB are deenergized. Relay RD thus recloses and relay RB reopens. When relay RB opens, relay RC is deenergized and its switches reclose. Thus, the initial circuit conditions are restored to be in readiness for the next vend cycle.

When the last item in magazine M1 is dispensed by dropping of the top shelf 15t, the blade 323 of empty switch 197-1 (see FIG. 21) opens off contact 325 and closes on contact 327. Then, when a purchaser pushes in button B1, a circuit is completed for the empty signal lamp E via line L6, the series of button-actuated switches S1, S2, etc., line 337, blade 323, line 351 extending from switch 197-1, blade 339 of transfer switch SS1, line 353, line L7 and line 307 to neutral line NL. The empty signal lamp E in line L7 is thereby energized to indicate that magazine M1 is empty and to advise the purchaser to make another selection.

Assuming that a purchaser (after insertion of money to close switch MS) pushes button B2 to obtain an item from magazine M2 (and assuming that there are items in the latter), switch S2 is closed and a circuit is thereby completed between lines L6 and L16 via S3, S2, line 361, blade 341 and contact 345 of transfer switch SS1, lines 357 and 355 and blade 323 and contact 325 of empty switch 197-2. Line L6 being energized and connected to line L16, a circuit is completed for relay coil CR2 (see FIG. 22) via line L16 (switch RDb being closed), and lines 311 and 307 to neutral line NL. Switches R2a, R2b R2c thereupon close. Upon closure of switch R2a, holding circuit 315 for relay R2 is completed. Upon closure of switches R2b and R2c, lines L34 and 307 are energized. With line 307 energized, relay coil CRD is energized, and switches RDa, RDb and RDc open to render the push buttons ineffective. With line L34 energized, motor 141-2 for magazine M2 is energized to drive the cam 147 and disk 185 of the operating unit 137 for magazine M2. This results in rotation of the trip-operating bar of magazine M2 for dispensing an item therefrom in the same manner as above described for magazine M1.

As the disk 185 of unit 137 for magazine M2 approaches the end of a revolution, the roller 184 on the end of the operating arm 183 for the disk-operated switch 181-2 associated with magazine M2 drops into the notch 187 in the disk, and the blade 367 of this switch opens from its contact 369 and closes on its contact 371 (see FIG. 21). This connects line L1 (energized directly from power line PL) to line L4. Coil CRB of relay RB is thereupon energized via line L4, and switches RBa and RBb of this relay close. Closure of switch RBa establishes holding circuit 321 for coil CRB. Roller 184 moves out of notch 187 as the disk 185 completes a revolution so that switch 181-2 returns to its initial position with its blade 367 on contact 369. Accordingly, line L3 is energized from line L1. With line L3 energized and switch RBb of relay RB closed, coil CRC of relay RC is energized. This opens switches RCa and RCb. This deenergizes holding circuit 319 for relay CRA, and the latter opens. It also deenergizes holding circuit 315 for relay R2 and the latter opens. With R2 open, switches R2b and R2c are open to deenergize lines L34 and 307, with the result that motor 141-2 and relay coils CRD and CRB are deenergized. Relay RD thus recloses and relay RB reopens. When relay RB opens, relay RC is deenergized and its switches reclose. Thus, the initial circuit conditions are restored to be in readiness for the next vend cycle.

When the last item in magazine M2 is dispensed by dropping of its top shelf 15t, the blade 323 of empty switch 197-2 (see FIG. 21) opens off its contact 325 and closes on its contact 327. Then, when a purchaser pushes in button B2, a circuit is completed for the empty signal lamp E via line L6, switches S3 and S2, line 361 extending from S2, blade 341 and contact 345 of transfer switch SS1, lines 357 and 355 extending to empty switch 197–2, blade 323 and contact 327 of the latter, line 351 extending from switch 197–2, blade 339 and contact 343 of transfer switch SS2, line 353 extending from the latter, line L7 and line 307 to neutral line NL. The empty signal lamp E in line L7 is thereby energized to indicate that magazine M2 is empty and to advise the purchaser to make another selection.

Assuming that a purchaser (after insertion of money to close switch MS) pushes button B3 to obtain an item from magazine M3 (and assuming that there are items in the latter), switch S3 is closed and a circuit is thereby completed between lines L6 and L17 via S3, line 361 extending from S3, blade 341 and contact 345 of transfer switch SS3, lines 357 and 355 extending from SS3 and blade 323 and contact 325 of empty switch 197–3. Line 6 being energized and connected to line L17, a circuit is completed for relay coil CR3 (see FIG. 22) via line L17 (switch RDc being closed), and lines 311 and 307 to neutral line NL. Switches R3a, R3b and R3c thereupon close. Upon closure of switch R3a, holding circuit 317 for relay R3 is completed. Upon closure of switches R3b and R3c, lines L35 and 307 are energized. With line 307 energized, relay coil CRD is energized, and switches RDa, RDb and RDc open to render the push buttons ineffective. With line L35 energized, motor 141–3 for magazine M3 is energized to drive the cam 147 and disk 185 of the operating unit 137 for magazine M3. This results in rotation of the trip-operating bar of magazine M3 for dispensing an item therefrom in the same manner as above described for magazine M1.

As the disk 185 of unit 137 for magazine M3 approaches the end of a revolution, the roller 184 on the end of the operating arm 183 for the disk-operated switch 181–3 associated with magazine M3 drops into the notch 187 in the disk, and the blade 367 of this switch opens from its contact 369 and closes on its contact 371 (see FIG. 21). This connects line L1 (energized directly from power line PL) to line L4. Coil CRB of relay RB is thereupon energized via line L4, and switches RBa and RBb of this relay close. Closure of switch RBa establishes holding circuit 321 for coil CRB. Roller 184 moves out of notch 187 as the disk 185 completes a revolution so that switch 181–3 returns to its initial position with its blade 367 on contact 369. Accordingly, line L3 is energized from line L1. With line L3 energized and switch RBb of relay RB closed, coil CRC of relay RC is energized. This opens switches RCa and RCb. This deenergizes holding circuit 319 for relay CRA, and the latter opens. It also deenergizes holding circuit 317 for relay R3 and the latter opens. With R3 open, switches R3b and R3c are open to deenergize lines L35 and 307, with the result that motor 141–3 and relay coils CRD and CRB are deenergized. Relay RD thus recloses and relay RB reopens. When relay RB opens, relay RC is deenergized and its switches reclose. Thus, the initial circuit conditions are restored to be in readiness for the next vend cycle.

When the last item in magazine M3 is dispensed by dropping of its top shelf 15t, the blade 323 of empty switch 197–3 (see FIG. 21) opens off its contact 325 and closes on its contact 327. Then, when a purchaser pushes in button B3, a circuit is completed for the empty signal lamp E via line L6, switch S3, line 361 extending from S3, blade 341 and contact 345 of transfer switch SS2, lines 357 and 355 extending from the latter, line 365, line L7 and line 307 to neutral line NL. The empty signal lamp E in line L7 is thereby energized to indicate that magazine M3 is empty and to advise the purchaser to make another selection.

Now it will be assumed that both transfer switches SS1 and SS2 are set in their second position, in which their blades 339 and 341 are on contacts 347 and 349. Under these circumstances, closure of any one of switches S1, S2 or S3 results in energization of line L15 for energization of line L33 to energize motor 141–1 for magazine M1 for vending therefrom until it is emptied. Thus, when switch S1 is closed, line L15 is energized in the same manner as previously described. When S2 is closed, line L15 is energized from line L6 via switch S3, line 335 connecting S3 and S2, blade 329 and contact 333 of S2, line 361, blade 341 and contact 349 of transfer switch SS1, lines 359 and 337, and blade 323 and contact 325 of empty switch 197–1. When S3 is closed, line L15 is energized from line L6 via S3, line 361 extending from S3, blade 341 and contact 349 of transfer switch SS2, line 363, blade 341 and contact 349 of transfer switch SS1, lines 359 and 337 and blade 323 and contact 325 of empty switch 197–1.

When magazine M1 is emptied, the blade 323 of empty switch 197–1 opens from its contact 325 and closes on its contact 327. Thereupon, closure of any one of switches S1, S2 or S3 results in energization of line L16 for energization of line L34 to energize motor 141–2 for magazine M2 for vending therefrom until it is empty. Thus, when switch S1 is closed, line L16 is energized from line L6 via switches S3, S2, S1, line 337, blade 323 and contact 327 of switch 197–1, line 351 extending from 197–1, blade 339 and contact 347 of transfer switch SS1, line 355 extending from the latter, and blade 323 and contact 325 of switch 197–2. When S2 is closed, line L16 is energized from line L6 via switches S3 and S2, line 361, blade 341 and contact 349 of transfer switch SS1, line 359, line 337, blade 323 and contact 327 of 197–1, line 351 extending from 197–1, blade 339 and contact 347 of transfer switch SS1, line 355 extending from the latter, and blade 323 and contact 325 of 197–2. When S3 is closed, line L16 is energized from line L6 via switch S3, line 361 extending from S3, blade 341 and contact 349 of transfer switch SS2, line 363, line 361 connected to blade 341 of SS1, and thence to line L16 in the same manner as when S2 is closed.

When magazine M2 is emptied, blade 323 of empty switch 197–3 opens from its contact 325 and closes on its contact 327. Thereupon, closure of any one of switches S1, S2 or S3 results in energization of line L17 for energization of line L35 to energize motor 141–3 for magazine M3 for vending therefrom. Thus, when switch S1 is closed, line L17 is energized from line L6 via switches S3, S2, S1, line 337, blade 323 and contact 327 of empty switch 197–1, line 351 extending from 197–1, blade 339 and contact 347 of SS1, line 355 extending from SS1, blade 323 and contact 327 of 197–2, line 351 extending from 197–2, blade 339 and contact 347 of SS2, line 355 extending from SS2, and blade 323 and contact 325 of 197–3. When S2 is closed, line 17 is energized from line L6 via S3 and S2, line 361 extending from S2, blade 341 and contact 349 of SS1, line 337 and thence to line L17 in the same manner as when S1 is closed. When S3 is closed, line L17 is energized from L6 via line 361 extending from S3, blade 341 and contact 349 of SS2, line 363, line 361 extending to SS1, and thence to line L17 in the same manner as when S1 is closed.

From the above, it will be apparent that, with the transfer switches SS1 and SS2 for each two successive magazines or dispensers M1–M2 and M2–M3 set in their first position as illustrated in FIG. 21, a circuit is completed for each magazine or dispenser through the respective empty switch 197–1, 197–2 or 197–3 only on operation of the respective purchaser-operable switch S1, S2 or S3 until the magazine or dispenser is empty. Thus, a circuit is completed for magazine or dispenser M1 through empty switch 197–1 only on operation of purchaser-operable switch S1 until M1 is empty. A circuit is completed for M2 through empty switch 197–2 only on operation of purchaser-operable switch 32 until M2 is empty. A circuit is completed for M3 through empty switch 197–3 only on operation of purchaser-operable switch S3 until M3 is empty. The mode of operation for the remainder of the magazines in the complete layout of eighteen magazines is the same. When any magazine is empty, and the respective purchaser-operable switch therefor is actuated, the empty signal lamp E is energized.

When the transfer switches SS1 and SS2 are set in their second position, a circuit is completed for the first magazine or dispenser M1 through its empty switch 197–1 each time any purchaser-operable switch S1, S2 or S3 is actuated until the first empty switch 197–1 is actuated in response to emptying of M1. When M1 is empty, a circuit for the second magazine or dispenser M2 is completed through the first empty switch 197–1, the first transfer switch SS1 and the second empty switch 197–2 each time any purchaser-operable switch S1, S2 or S3 is actuated until the second empty switch 197–2 is actuated in response to emptying of M2. When M2 is empty, a circuit for the third magazine or dispenser M3 is completed through the first empty switch 197–1, the first transfer switch SS1, the second empty switch 197–2, the second transfer switch SS2 and the third empty switch 197–3 each time any purchaser-operable switch S1, S2 or S3 is actuated until the third empty switch 197–3 is actuated in response to emptying of M3.

If all seventeen transfer switches in the complete layout were initially set in their second position, vending would proceed in sequence throughout the entire eighteen magazines or dispensers M1–M18 as each becomes empty in response to actuation of any one of the eighteen purchaser-operable switches. Usually, however, only a series of magazines less than the full eighteen would be so utilized.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrated and not in a limiting sense.

We claim:

1. A vending machine comprising a series of electrically actuated dispensers, a series of purchaser-operable switches one for each dispenser, a series of empty switches one for each dispenser and each operable in response to emptying of the respective dispenser, a series of transfer switches one for each two successive dispensers and each adapted to be set in a first position or a second position, and interconnections between said switches and dispensers adapted when the transfer switches are in their first position to complete a circuit for each dispenser through the respective empty switch only on operation of the respective purchaser-operable switch and until the dispenser is empty, and adapted when the transfer switches are in their second position to complete a circuit for the first dispenser through its empty switch each time any purchaser-operable switch is actuated and until the first empty switch is actuated in response to emptying of the first dispenser, then to complete a circuit for the second dispenser through the first empty switch, the first transfer switch and the second empty switch each time any purchaser-operable switch is actuated and until the second empty switch is actuated in response to emptying of the second dispenser, and so on throughout the series.

2. In a vending machine as set forth in claim 1, including electrical signal means energized in response to operation of any empty switch upon emptying of the respective dispenser when said transfer switches are in their first position.

3. A vending machine comprising a series of dispensers, an electric motor for each dispenser each operable through a vend cycle for vending an item from the respective dispenser, a series of purchaser-operable switches one for each motor, a series of empty switches one for each dispenser and each operable in response to emptying of the respective dispenser, a series of transfer switches one for each two successive dispensers and each adapted to be set in a first position or a second position, and interconnections between said switches and motors adapted when the transfer switches are in their first position to complete a circuit for the motor of each dispenser through the respective empty switch and to hold the circuit to complete a vend cycle only on operation of the respective purchaser-operable switch and until the dispenser is empty, and adapted when the transfer switches are in their second position to complete a circuit for the motor for the first dispenser through its empty switch and to hold the circuit to complete a vend cycle each time any purchaser-operable switch is actuated until the first empty switch is actuated in response to emptying of the first dispenser, then to complete a circuit for the motor for the second dispenser through the first empty switch, the first transfer switch and the second empty switch and to hold the circuit to complete a vend cycle each time any purchaser-operable switch is actuated until the second empty switch is actuated in response to emptying of the second dispenser, and so on throughout the series.

4. A vending machine as set forth in claim 3, including electrical signal means energized in response to operation of any empty switch upon emptying of the respective dispenser when said transfer switches are in their first position.

5. A vending machine comprising a series of dispensers each adapted to hold a stock of items, a series of electric motors one for each dispenser each operable through a vent cycle for vending an item from the respective dispenser, a series of purchaser-operable switches one for each motor, a series of empty switches one for each dispenser and each operable in response to emptying of the respective dispenser, a series of transfer switches one for each two successive dispensers and each adapted to be set in a first position or a second position, a series of relays one for each motor, a money switch, and interconnections between said switches, motors and relays adapted when the transfer switches are in their first position to complete a circuit for each relay through the respective empty switch to energize the respective motor and to hold the circuit to complete a vend cycle only on closure of the money switch and operation of the respective purchaser-operable switch and until the dispenser is empty, and adapted when the transfer switches are in their second position to complete a circuit for the first relay through the first emtpy switch to energize the first motor and to hold the circuit to complete a vend cycle each time the money switch is closed and any purchaser-operable switch is actuated until the first empty switch is actuated in response to emptying of the first dispenser, then to complete a circuit for the second relay through the first empty switch, the first transfer switch and the second empty switch to energize the second motor and to hold the circuit to complete a vend cycle each time the money switch is closed and any purchaser-operable switch is actuated until the second empty switch is actuated in response to emptying of the second dispenser, and so on throughout the series.

6. A vendnig machine as set forth in claim 5, wherein each empty switch is a double-throw switch adapted when the respective dispenser has one or more items therein to complete a circuit to the respective relay and when the respective dispenser is empty to complete a circuit through a respective transfer switch.

7. A vending machine as set forth in claim 6, wherein each transfer switch is a double-throw switch adapted when set in its first position to complete an empty signal circuit from the preceding empty switch and when set in its second position to complete a circuit from the preceding empty switch to the next empty switch.

8. A vending machine as set forth in claim 6, wherein each transfer switch is a double-throw double-pole switch adapted when set in its first position to complete an empty signal circuit from the preceding empty switch and when set in its second position to complete a circuit from the preceding empty switch to the next empty switch and adapted to complete the appropriate relay circuit upon closure of any of the purchaser-operable switches.

9. A vending machine as set forth in claim 8, wherein said motor relay circuits are completed through a lockout relay which is energized in response to energization of any motor relay to break all motor relay circuits thereby to render all of the purchaser-operable switches ineffective until a vend cycle is completed.

10. A vending machine as set forth in claim 9, including a relay controlled by the money switch and controlling the energization of said motor relay circuits, a normally closed relay controlling holding circuit for the money switch relay and the motor relays, a normally open relay controlling said holding relay, and a series of double-throw switches one associated with each motor and controlled thereby, each of said double-throw switches being thrown from a first to a second position as the respective motor nears the completion of a cycle to complete a circuit for the normally open relay and then being returned to first position to complete a circuit for the normally closed relay via the normally open relay.

References Cited in the file of this patent
UNITED STATES PATENTS

| | | |
|---|---|---|
| 2,076,564 | Hoban | Apr. 13, 1937 |
| 2,392,511 | Thompson et al. | Jan. 8, 1946 |
| 2,531,238 | Tandler et al. | Nov. 21, 1950 |
| 2,586,351 | Larimore | Feb. 19, 1952 |
| 2,638,396 | Gabrielsen | May 12, 1953 |
| 2,652,301 | Skillman et al. | Sept. 15, 1953 |
| 2,661,827 | Munz et al. | Dec. 8, 1953 |
| 2,802,474 | Du Grenier et al. | Aug. 13, 1957 |
| 2,936,931 | Forst et al. | May 17, 1960 |
| 2,973,075 | Du Grenier et al. | Feb. 28, 1961 |

FOREIGN PATENTS

| | | |
|---|---|---|
| 756,264 | France | Sept. 18, 1933 |